US006298539B1

(12) United States Patent
Dissing

(10) Patent No.: US 6,298,539 B1
(45) Date of Patent: Oct. 9, 2001

(54) APPLIANCE FOR THE EMERGENCY OPENING OF THE DOORS OF A VEHICLE

(76) Inventor: Claus Hornstrup Dissing, Agnetevej 17, DK-8680, Ry (DK)

(*) Notice: Subject to any disclaimer, the term of this patent is extended or adjusted under 35 U.S.C. 154(b) by 0 days.

(21) Appl. No.: 09/423,666
(22) PCT Filed: May 20, 1998
(86) PCT No.: PCT/DK98/00204
§ 371 Date: Nov. 22, 1999
§ 102(e) Date: Nov. 22, 1999
(87) PCT Pub. No.: WO98/53167
PCT Pub. Date: Nov. 26, 1998

(30) Foreign Application Priority Data

May 20, 1997 (DK) .......... 0575/97

(51) Int. Cl.[7] .......... B23P 19/00
(52) U.S. Cl. .......... 29/426.5; 29/270; 29/239; 81/15.9; 254/93 HP
(58) Field of Search .......... 81/15.9; 29/239, 29/426.5, 270; 254/93 HP

(56) References Cited

U.S. PATENT DOCUMENTS 1,459,317 * 6/1923 Birdsall .
1,508,418 * 9/1924 Stewart .
2,283,089 * 5/1942 Pfauser .
2,480,477 * 8/1949 Jones .
2,796,271 6/1957 Darmstadter .
3,762,688 * 10/1973 Leonhardt .
3,822,861 * 7/1974 Scott .......... 254/93
4,443,001 * 4/1984 Haerer .
4,518,151 * 5/1985 Dill .......... 254/93
4,833,767 5/1989 Parkins .
4,836,061 * 6/1989 Weinraub .
4,941,073 * 7/1990 Bolton .
5,104,094 4/1992 Womack .

OTHER PUBLICATIONS

Equalizer Industries catalog, undesignated pages (incomplete), 1992.*
Equalizer Industries Catalog, p. 49 (incomplete), 1999.*

* cited by examiner

*Primary Examiner*—P. W. Echols
*Assistant Examiner*—Steve Blount
(74) *Attorney, Agent, or Firm*—Nixon Peabody LLP; David S. Safran

(57) ABSTRACT

The breakdown services have many task involving the unlocking of automobile doors. The problem is normally solved by pressing a wedge-shaped element down between the door window and the rubber sealing strip which abuts against the window, whereby access can be gained for the insertion of an unlocking tool without having to remove the sealing stip. However, the downwards insertion of the wedge-shaped element can give rise to damage to the sealing strip. This is avoided with the process according to the invention, in that instead of the wedge, use is made of a flat, inflatable pillow element of flexible, distensible material. The flat pillow element is easy to insert downwards, and by a subsequent inflation it will press directly outwards on the sealing list without at the same time scraping against the list.

2 Claims, 1 Drawing Sheet

APPLIANCE FOR THE EMERGENCY OPENING OF THE DOORS OF A VEHICLE

Figure 1:
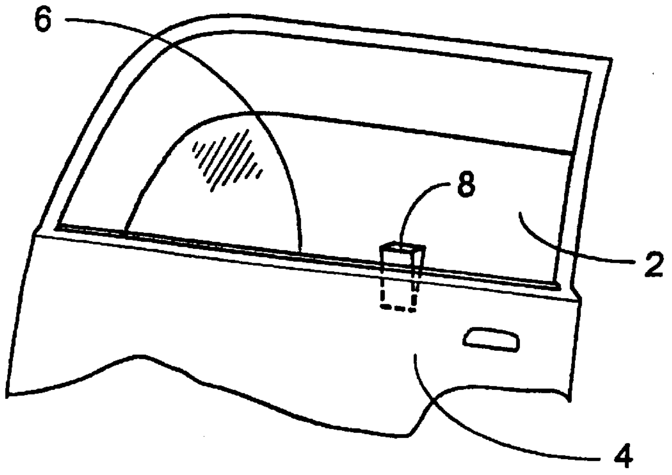
Fig. 1 (Prior Art)

The present invention concerns an appliance for use in the authorised opening of locks in the doors of automobiles in situations in which the driver of the automobile has locked himself out, typically by having slammed the door shut after having left a combined door- and ignition key in the automobile with the doors now consequently locked. The relevant motorist breakdown services receive many calls annually concerning emergency assistance in such situations.

In order to open a door which has been locked in this manner, it is almost universal practice to gain access to the door locking system by removing or locally compressing the rubber sealing strip which normally exists at the outer upper edge of the door, which receives the lowerable automobile window, in that this makes it possible to insert a tool along the outer side of the window for the gripping of a relevant part of the lock system for the unlatching of the lock. If the sealing strip is torn off, it can prove difficult to replace this in a proper manner, and therefore it is instead normally preferred to carry out said compression of the strip whereby it is only influenced locally without removal.

Such a compression is relatively easy to effect by the insertion of a wedge-shaped tool down along the outer side of the lower part of the window. However, this downward-insertion can give rise to damage to the sealing strip, i.e. in the last phase where the strip is influenced towards maximum horizontal compression during the continued downwards insertion of the wedge-shaped tool.

With the present invention it has been found possible in an attractive manner to utilise a completely different kind of appliance for this purpose, i.e. a flat, inflatable pillow with opposing, flexible and mutually edge-assembled and substantially distensible side parts between which air can be introduced for the distension of the flat pillow, especially at its middle region, for example with a rubber ball connected via a tube.

A flat pillow such as this can in its pressed-flat condition appear as a quite thin element which, while although being flexible, is in its own plane a quite stiff element, e.g. consisting of two layers of armoured plastic foil of sufficient thinness to enable it to be easily inserted down between the outer side of the automobile window and the inner edge of the said sealing list until the middle region of the flat pillow lies level with this inner edge.

Thereafter, when air is pressed into the flat pillow, this will distend mostly in precisely its middle region, in that because of the distensible side surfaces it will not behave in the manner of a balloon, which will distend in all directions where there is no external counter-pressure, but will be forced to distend mostly in precisely the middle region. Therefore, the flat pillow will be particularly suitable for said application in co-operating with the inner edge of the selling strip, in that the same pillow, regardless of the fact that it extends both upwardly and downwardly from this edge area, will transfer its compressive force precisely to the edge area and the opposite glass surface without any significant bulging-out neither over nor under the edge area of the sealing list.

The result will be that after the downwards insertion of the flat pillow in its completely flat state, and by the inflation of the pillow element, it will effect an outwardly directed displacement of the sealing strip without this being connected with any form of downwardly-directed movement by the relevant appliance, i.e. without the sealing strip being damaged in any way, in that it can subsequently be gently relieved of the displacement merely by exhausting the air from the inflated pillow. This can thereafter easily be drawn up in its now re-established flat state, again without any related and significant scraping effect on the sealing strip which is again almost fully expanded.

Figure 2:
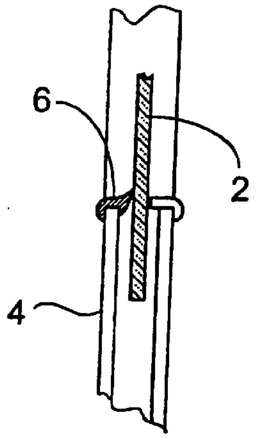
Figure 3:
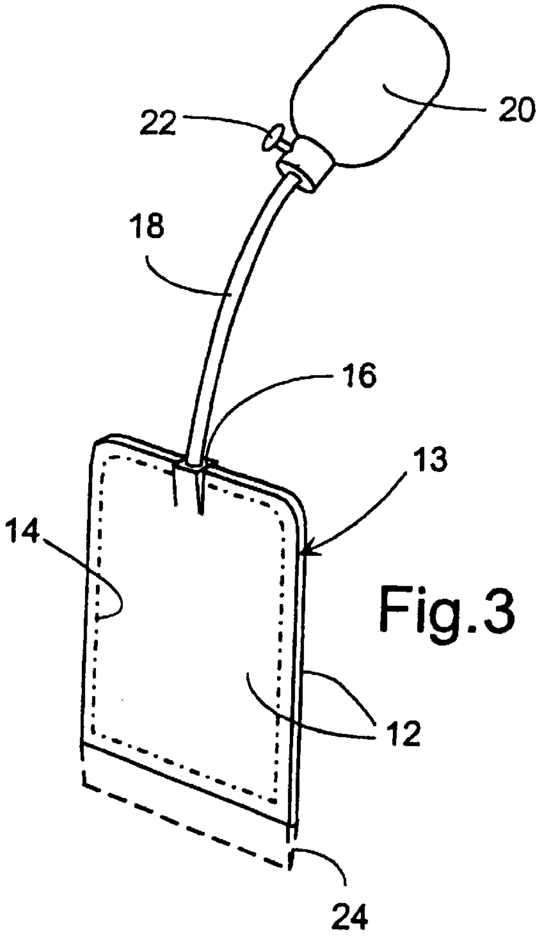
Figure 4:
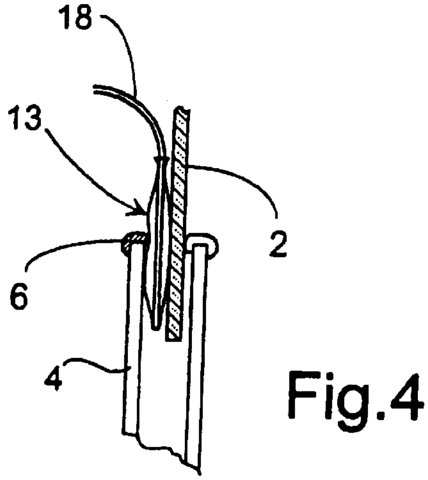

The invention will now be described in more detail with reference to the drawing, where FIG. 1 is a perspective view of an automobile door, FIG. 2 is a sectional view of a part thereof, FIG. 3 is a perspective view of an appliance according to the invention, and FIG. 4 is a view corresponding to FIG. 2.

The automobile door shown in FIG. 1 is conventional and needs no further description. A sealing strip 6 is provided between the window 2 and the outside of the door 4, and in order to gain access for the emergency opening of the door when the window 2 is closed, this strip can be subjected to a local compression. This can be done with a suitable screwdriver or other form of wedge-shaped element 9 which is pressed downwards in the normally tight crack between the window and the strip, whereby a suitable opening for the downwards-insertion of a tool is created immediately at the side of the element 8. However, the necessary downwards pressure of the wedge element can give rise to visible damages which are preferably to be avoided.

The appliance 10 shown in FIG. 3 consists of two flat pieces 12 of flexible but reinforced and distensible foil or thin-plate material which are joined together along the edges, e.g. by welding along the dot-dash line 14 in the formation of an inner airtight region between the pieces 12. This inner region is connected via a tube is to a valve-ball 20 which can be operated for the introduction of air between the pieces 12. The ball 20 is provided with an air-venting valve with an activation button 22.

The pieces 12 thus form a flat pillow element 13 which, despite the instretchability of these parts, can be inflated in such a manner that a distinct increase can be achieved in the small normal thickness.

Precisely for reasons of its thinness, the flat pillow element 13 can easily be inserted down in the crack between the window 2 and the sealing strip 6, and it is without any related damaging influence that the pillow element is hereby inserted so far down that its middle region is placed opposite site the strip 6. Thereafter, when the air-ball 20 is activated by being squeezed a few times, the pillow element will be inflated to the position shown in FIG. 4, where the pillow presses inwards against the window 2 and outwards against the sealing strip 6 There is hereby achieved quite the same outwards deflection of the strip 6 as that when use is made of the wedge-shaped element 8 in FIG. 1, but here with the important difference that the outwards pressure is effected solely in the completely lateral direction without the possibility of any damaging influence.

When the work of unlocking the door has been carried out, the air-venting valve 22 is activated and the pillow element 13 deflates partly under its own volition and partly under pressure from the sealing strip. Although this flattening-out is not immediately total, the thickness of the inflated element will decrease so much that it can hereafter be drawn upwards quite easily, again without causing any damage to the sealing strip 6, which is now fully straightened out.

As indicated by the stippled line in FIG. 3, it is possible for the flat pillow element 13 to have a lower extension in the form of a sharp edge part 24, which will further ease the downwards insertion of the element in the above-mentioned crack.

Furthermore, as also shown in FIG. 3, the pillow element 13 is about as wide as it is long, i.e., it is approximately square.

It is important that the sides of the flat element 12 are substantially distensible, so that the flat pillow element is not inflated in the same manner as a balloon. If such was the case, there would not be any particularly high pressure built up on the strip 6, since the pillow element would thus merely distend freely in all other areas.

What is claimed is:

1. Method for the authorized emergency opening of a vehicle door, comprising the steps of:

with the vehicle door in a normal closed and locked condition, as a first step for providing access to an interior space of the vehicle, inserting a thin and flat inflatable pillow element, formed of a pair of flexible and nonstretchable sheets of a sheet material that is stiff in a plane of the sheets and which are joined together at perimetric edges thereof, between a vehicle door surface and vehicle surface in proximity to said vehicle door surface in a flat state;

inflating said pillow element so as to separate said flexible sheets creating an access opening between said vehicle door surface and the vehicle surface in proximity thereto by deflecting one of said surfaces with respect to the other of said surfaces.

2. Method according to claim 1, wherein approximately half of said pillow element is inserted between said vehicle door surface and the vehicle surface in proximity thereto during said inserting step so that a central area of the pillow element produces said deflecting one of said surfaces with respect to the other of said surfaces.

* * * * *